United States Patent [19]

Miyashita et al.

[11] 4,377,229

[45] Mar. 22, 1983

[54] APPARATUS FOR CONVEYING COPY SHEET FOR ELECTROPHOTOGRAPHIC COPYING MACHINE

[75] Inventors: Kiyoshi Miyashita, Hachioji; Tatuo Takizawa, Sagamihara; Kazuo Sugawa, Saitama; Masaji Nishikawa, Hachioji, all of Japan

[73] Assignee: Olympus Optical Company Ltd., Tokyo, Japan

[21] Appl. No.: 184,668

[22] Filed: Sep. 8, 1980

[30] Foreign Application Priority Data

Sep. 28, 1979 [JP] Japan .......................... 54/134762[U]
Apr. 25, 1980 [JP] Japan .......................... 55/057030[U]

[51] Int. Cl.$^3$ .............................................. B65G 45/00

[52] U.S. Cl. .................................. 198/494; 15/1.5 R

[58] Field of Search ........................ 198/494, 497, 499; 15/1.5 R, 256.51; 355/15

[56] References Cited

U.S. PATENT DOCUMENTS

| | | | |
|---|---|---|---|
| 224,719 | 2/1880 | Osborne | 15/1.5 R |
| 2,151,273 | 3/1939 | Hess | 15/1.5 R |

*Primary Examiner*—John J. Love
*Assistant Examiner*—Douglas D. Watts
*Attorney, Agent, or Firm*—Weinstein & Sutton

[57] ABSTRACT

A conveying apparatus includes a plurality of pairs of conveying rollers which are disposed for abutment against each other for transporting a copy sheet carrying an unfixed toner image thereon toward a fixing unit. A cleaning member is disposed for abutment against those rollers which are adapted to contact the toner image to clean them and to charge them triboelectrically to the same polarity as the toner.

7 Claims, 11 Drawing Figures

APPARATUS FOR CONVEYING COPY SHEET FOR ELECTROPHOTOGRAPHIC COPYING MACHINE

BACKGROUND OF THE INVENTION

The invention relates to an apparatus for conveying a copy sheet for an electrophotographic copying machine, and more particularly, to such an apparatus which may be utilized to convey a copy sheet carrying an unfixed toner image thereon to a fixing unit.

In an electrophotographic copying machine, a conveying apparatus is used to transport a copy sheet onto which a toner image has been transferred at a transfer station, to a fixing unit. In such a conveying apparatus, it is desirable that the conveying operation can be achieved without utilizing a first surface of the copy sheet which carries the unfixed toner image, while utilizing only the second surface thereof in order to prevent any damage caused to the toner image. However, to convey a copy sheet which is very light in weight in an accurate manner by means of rollers and belt, the copy sheet must be attracted to these rollers or belt with a frictional force of a suitable magnitude.

To this end, a variety of means are proposed in the prior art. By way of example, FIG. 1 shows a conveying roller 4 having a peripheral surface which is charged to the opposite polarity from that of a copy sheet 1 carrying a toner image 2 on its surface so as to produce an attraction therebetween. Alternatively, FIG. 2 illustrates a suction unit 4b which attracts the copy sheet 1 against the upper surface of a conveyor belt 4a. In FIGS. 1 and 2, numeral 3 indicates a heating and fixing unit. It will be appreciated that the use of the electrostatic interaction in the arrangement of FIG. 1 is adversely influenced by the humidity and requires an expensive power supply unit, resulting in an increased cost. The use of the suction unit in the arrangement of FIG. 2 results in an increased overall size and a complex construction, disadvantageously causing a substantial increase in the cost.

To avoid these disadvantages, there is proposed an arrangement as illustrated in FIGS. 3 and 4 where a roller 5*a* is disposed to bear against the marginal portion of the front surface of the copy sheet in a region where no image is produced, thereby holding the copy sheet 1 between it and a drive roller 5*b* which is disposed on the opposite side thereof. However, this arrangement causes an instability in the direction in which the copy sheet 1 is being conveyed. In particular, where a copy sheet of half size is used, the roller 5*a* can be located on only one lateral side, giving rise to the likelihood that the copy sheet may be skewed. In this instance, high mechanical accuracy is required of the combination of rollers 5*a*, 5*b* which hold the copy sheet 1 therebetween, resulting in a troublesome operation.

As a further alternative, FIG. 5 illustrates the use of a roller 6 in the form of a spur wheel or having acicular projections so that the area of its contact with the surface of the copy sheet 1 may be minimized. A plurality of such rollers may be used in combination with a drive roller 5*c*. However, the tip ends of these rollers scar or damage the surface of the copy sheet 1 and carry the toner over to non-image areas, thus marring the copy sheet.

Finally, FIG. 6 illustrates the use of a disc-shaped roller 7 having a reduced thickness and bearing against the front surface of the copy sheet 1, in combination with a cleaning member 9 which operates to scrape any toner 8 off the peripheral surface of the roller 7. With this arrangement, when it is used to convey a number of copy sheets, an accumulation of the toner 8 removed is formed on the cleaning member 9, eventually resulting in marring the roller 7 or falling of the toner onto the copy sheet 1 directly to mar the copy sheet 1.

SUMMARY OF THE INVENTION

It is a principal object of the invention to eliminate the described disadvantages of a conventional apparatus for conveying a copy sheet, by providing an apparatus for conveying a copy sheet for an electrophotographic copying machine in which there are provided a plurality of vertically aligned pairs of conveying rollers to convey a copy sheet therebetween, with those conveying rollers, which are disposed to bear against the surface of the copy sheet carrying a toner image, being disposed in sliding contact with a cleaning member which is urged thereagainst under pressure and being triboelectrically charged to the same polarity as the polarity of the toner, thus avoiding any deposition of toner on these rollers.

It is another object of the invention to provide an apparatus for conveying a copy sheet of the type described in which the conveying rollers and the cleaning member are formed of selected materials and the cleaning member is urged against the conveying rollers by means of a spring member having a suitable resilience, thereby assuring an improved and accurate operation of the apparatus.

In accordance with the invention, there is provided an apparatus for conveying a copy sheet which is very simple in construction, inexpensive to manufacture and highly reliable in operation to convey a copy sheet positively in a given direction, without causing a damage or marring of the copy sheet.

An arrangement is made such that when a given amount of toner is deposited on a region of the cleaning member where it bears against the conveying rollers, a saturation is reached which prevents any subsequent deposition of toner, which instead is caused to be dispersed under the influence of the deposited toner. In this manner, a continued deposition of toner on the rollers is avoided, thus eliminating a marring of the copy sheet. That amount of toner which has been deposited on the cleaning member until saturation is reached can be simply removed without dismounting the cleaning member, whereby an optimum condition can be maintained.

DESCRIPTION OF PREFERRED EMBODIMENTS

Figure 1:
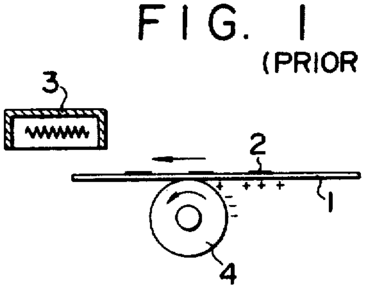
FIG. 1 (PRIOR ART)
FIGS. 1 and 2 are schematic cross sections of several examples of a conventional apparatus for conveying a copy sheet.
Figure 2:
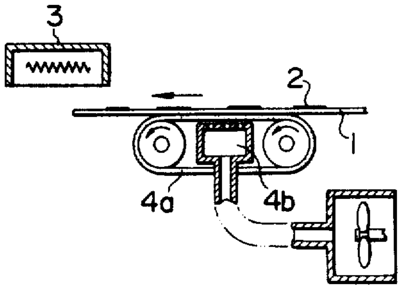
FIG. 2 (PRIOR ART)
Figure 3:
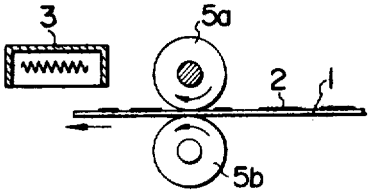
FIG. 3 (PRIOR ART)
FIGS. 3 and 4 are a schematic side elevation and front view of another example of a conventional apparatus for conveying a copy sheet.
Figure 4:
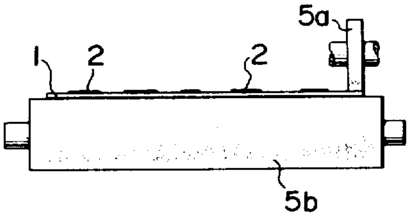
FIG. 4 (PRIOR ART)
Figure 5:
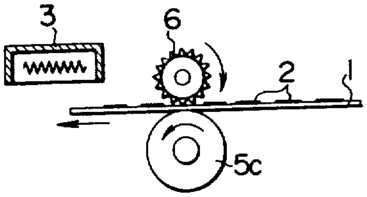
FIG. 5 (PRIOR ART)
FIGS. 5 and 6 are schematic side elevations of further examples of conventional apparatus for conveying a copy sheet.
Figure 6:
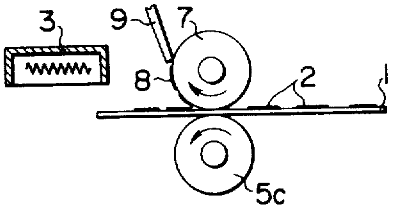
FIG. 6 (PRIOR ART)
Figure 7:
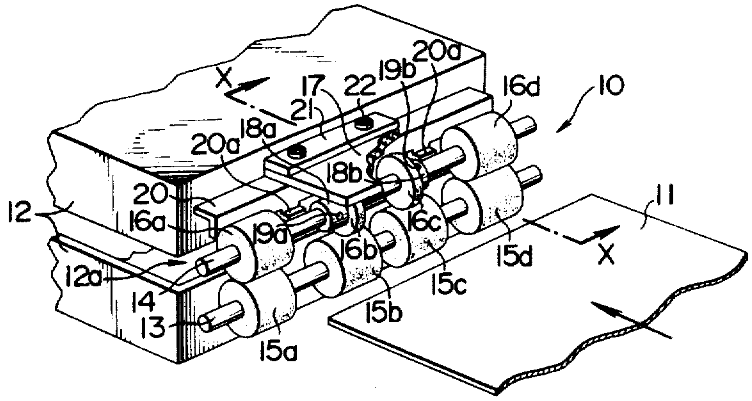
FIG. 7 is a perspective view of an apparatus for conveying a copy sheet constructed according to one embodiment of the invention.
Figure 8:
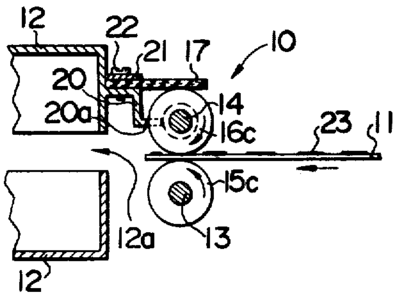
FIG. 8 is a cross section taken along the line X—X shown in FIG. 7.

FIG. 7 is a perspective view of an apparatus for conveying a copy sheet according to one embodiment of the invention, while FIG. 8 is a cross section taken along the line X—X shown in FIG. 7. Referring to these Figures, the apparatus 10 is disposed in front of an opening 12*a* of a heating and fixing unit 12 into which a copy sheet 11 carrying an unfixed toner image is fed. The apparatus essentially comprises a pair of roller support shafts 13, 14 which extend horizontally along the opening 12*a* and in parallel relationship with each other and which are rotatably mounted. A plurality of vertically aligned pairs of conveying rollers 15*a*–15*d*, 16*a*–16*d* are fixedly mounted on the roller support shafts 13, 14, respectively, to hold the copy sheet 11 therebetween and to convey it. A cleaning member 17 in the form of a flat plate is fixedly mounted on the fixing unit 12 so as to be urged against the peripheral surface of two middle rollers, 16*b*, 16*c*, (which are hereafter referred to as "sliding contact rollers") of the upper rollers which are located for contact with the front surface of the copy sheet 11, namely, the surface carrying the toner image.

It is to be understood that the support shafts 13, 14 are rotatably mounted on stationary members, not shown, and are driven at a given conveying speed for the copy sheet in synchronism with other mechanisms of the electrophotographic copying machine. Obviously, these shafts rotate in a direction to feed the copy sheet 11 into the fixing unit 12.

The four rollers 15*a*–15*d* fixedly mounted on the lower shaft 13 and the end rollers 16*a*, 16*d* fixedly mounted on the opposite ends of the upper shaft 14 are of an identical configuration and has a reduced axial length. The rollers 16*b*, 16*c* which are fixedly mounted on an intermediate portion of the upper shaft 14 has a reduced thickness, resembling a flange-shaped roller, but have an outer diameter which is the same as the remaining rollers. The both rollers 16*b*, 16*c* include bosses 18*a*, 18*b*, which are secured to the support shaft 14 by means of set screws 19*a*, 19*b* engaging the bosses. It will be noted that the both rollers 16*b*, 16*c* are disposed in a symmetrical manner with respect to each other relative to a medium plane therebetween. The sliding contact rollers 16*b*, 16*c* may be formed of a resin material such as Teflon, and the flange-shaped peripheral portion which is disposed for contact with the copy sheet 11 has a width on the order of 1 mm. The peripheral portion is arcuate in cross section to reduce the area of its contact with the copy sheet 11 as much as possible, possibly to that of a line contact. In addition, the peripheral surface is finished as smoothly as possible.

The rollers 15*b*, 15*c* fixedly mounted on the lower shaft 13 in vertical alignment with the rollers 16*b*, 16*c* are formed of frictional rubber having a relatively high hardness on the order of H80°–90°, for example. Other rollers 16*a*, 16*d*, 15*a*, 15*d* are also of the same material and of the identical configuration as the rollers 15*b*, 15*c* so that the rollers 16*a*–16*d* on the upper shaft 14 are maintained in abutment against the rollers 15*a*–15*d* on the lower shaft 13 with a suitable pressure.

The cleaning member 17 is formed by shaping a relatively porous felt material (as available under the trademark "NOMEX") including polyamide fibres (nylon) into a plate form, and is secured to the upper surface of antijamming member 20, integrally mounted on the front end of the fixing unit 12, by means of a locking plate 21 and locking screws 22.

The anti-jamming member 20 is in the form of an elongate metal strip which is folded into an inverted L-configuration, as viewed in cross section, and its horizontal limb is integrally secured to the front end of an upper frame of the fixing unit 12.

The bottom end of the vertical limb of the anti-jamming member 20 is partly formed with a horizontal extension 20*a* which extends close to the upper shaft 14 to prevent the copy sheet 11 from being wrapped around upper rollers as it is fed between the upper and lower rollers 16*a*–16*d* and 15*a*–15*d*. Because the rollers 16*b*, 16*c* are disposed in sliding contact with the cleaning member 17, triboelectricity is produced, and the materials for these members are chosen in consideration of the triboelectricity series so that the rollers 16*b*, 16*c* are charged to the negative polarity, namely, to the same polarity as that of the toner which is usually negative. Hence, if the rollers 16*b*, 16*c* thus charged to the negative polarity are brought into contact with unfixed toner image 23 on the copy sheet 11, the resulting repulsion prevents the toner from being deposited on the rollers 16*b*, 16*c*.

Nevertheless, since the rollers 16*b*, 16*c* are urged against the opposite rollers 15*b*, 15*c* and since the peripheral surface of these rollers are not perfectly smooth, but include microscopic unevenness therein, there occurs a deposition of toner on the peripheral surface of the rollers 16*b*, 16*c* even though the quantity of toner so deposited is small. The porous nature of the cleaning member 17 removes any small quantity of toner deposited on the peripheral surface of the rollers 16*b*, 16*c* by occlusion. This prevents unfixed toner image from being transferred onto the rollers. In this manner, the cleaning member 17 has a dual function of triboelectrically charging the rollers 16*b*, 16*c* and of cleaning any toner deposited on these rollers.

Experiments have shown that when the cleaning member 17 comprises the polyamide fibres, the use of Teflon for the rollers 16*b*, 16*c* is preferred than the use of nylon, in reducing the marring by the toner. This is also theoretically supported from a consideration of their positions in the triboelectricity series. What is important is that the rollers 16*b*, 16*c* be charged to the same polarity as that of the toner. For example, when the rollers disposed in sliding contact are formed of Teflon, the cleaning member 17 may be formed of a felt which comprises acetate fibres.

It should be understood that whenever the toner forming the image is charged to the positive polarity, the materials for the rollers and cleaning member are suitably chosen from a consideration of their positions in the triboelectricity series so that the rollers 16*b*, 16*c* are charged to the positive polarity.

While it is preferred that the rollers 15*b*, 15*c* located opposite to the sliding contact rollers 16*b*, 16*c* be formed of a material having a high level of hardness in principle, in reducing the degree of marring, this might cause a difficulty in consideration of the area of contact in that unless these rollers are finished to a high accuracy, the abutment may become non-uniform or an insufficient rigidity of the support shaft may cause a non-uniform abutment of the rollers to cause a non-smooth conveying of the copy sheet, whereby one of the rollers may abut against the mating roller to a greater degree than the other to increase the marring of the toner image in a corresponding region. Hence, in the embodiment described, the rollers **15*b*, 15*c*** are formed as rubber rollers having a high hardness, but it should be understood that metal rollers may also be used if a high mechanical accuracy is assured and the support shaft has sufficient rigidity.

In operation, a developing unit, not shown, of the electrophotographic copying machine with which the present apparatus is associated forms a toner image on the surface of a photosensitive drum, which image is transferred onto the copy sheet 11. As the copy sheet 11 is conveyed toward the opening **12*a* of the fixing unit 12, in a direction indicated by an arrow shown in FIG. 7, it is fed into the nip between the upper and lower rollers 16*a*–16*d*, 15*a*–15*d* disposed in front of the opening 12*a*, whereby it is conveyed into the opening 12*a* while being held therebetween. When the copy sheet 11 is fed into the fixing unit 12 through the opening 12*a*, it is heated therein, whereby the unfixed toner image on the copy sheet 11 melts and becomes fixed thereon. Subsequently, it is delivered to a copy tray located externally of the fixing unit 12**, by means of other conveying rollers, not shown.

During the time the copy sheet 11 is being conveyed by the apparatus 10, its front surface, namely, the surface carrying the toner image 23, is subject to a sliding contact on the order of line contact with the sliding contact rollers **16*b*, 16*c* as mentioned previously. In addition, the rollers 16*b*, 16*c* are charged to the negative polarity or the same polarity as the toner as a result of their sliding contact with the cleaning member 17, so that the repulsion therebetween prevents any substantial deposition of toner on the rollers 16*b*, 16*c***.

Any toner which is deposited on the peripheral surface of the sliding contact rollers **16*b*, 16*c* is removed by occlusion into the porous cleaning member 17 as they rotate in sliding contact with the latter, whereby the sliding contact rollers 16*b*, 16*c* present completely cleaned surfaces for contact with the copy sheet 11. Hence, any marring of the copy sheet 11 which might occur by the deposition of toner from the rollers 16*b*, 16*c*** is completely eliminated.

As mentioned previously, the cleaning member 17 is porous in nature to remove any toner deposited on the peripheral surface of the sliding contact rollers **16*b*, 16*c*** by occlusion. However, it will be appreciated that the capacity of occlusion is limited, and the cleaning member will no longer be able to absorb any toner if the saturation is reached. Hence, it must be replaced by a fresh cleaning member, or must be processed chemically, for example, for reuse. It is then to be noted that the need for such processing or replacement can be avoided by preventing the toner from being absorbed beyond a given amount through a suitable choice of the material for the cleaning member.

Figure 9:
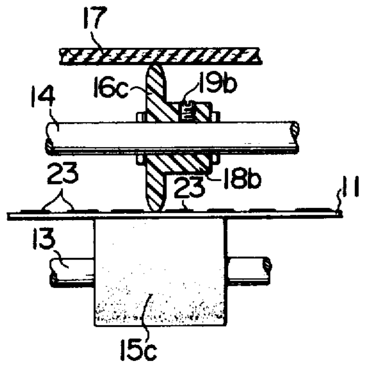
FIG. 9 is an enlarged cross section of one pair of vertically aligned conveying rollers shown in FIG. 7.
Figure 10:
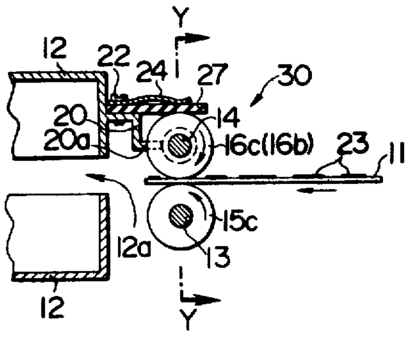
FIG. 10 is a cross section of a conveying apparatus according to another embodiment of the invention.

FIG. 10 shows a cross section of apparatus 30 for conveying copy sheet according to another embodiment of the invention. The apparatus 30 is constructed substantially similar to the apparatus 10 shown in connection with FIGS. 7 to 9 except for the material of the cleaning member and the provision of an associated spring member. Hence, similar parts are designated by like reference characters as before and will not be described.

In FIG. 10, a spring member 24 is a horizontally elongate resilient blade which is formed of stainless steel and which is centrally curved in the upward direction. One end of the spring member 24 is secured to the upper surface of the anti-jamming member 20, integral with the front end of the fixing unit 12, in superimposed relationship with a cleaning member 27, by means of locking screw 22.

The lower surface of the free end of the spring member 24 bears against the cleaning member 27 to urge it resiliently into abutment against the sliding contact roller **16*c* (16*b*)**.

The cleaning member 27 comprises a sheet of silicone rubber (available from Shinetsu Silicone Company as KE series) and having a thickness on the order of 1.5 mm, for example. The cleaning member 27 is configured in the same manner as the cleaning member 17 shown in FIG. 8. The sliding contact roller **16*c* (16*b*) is formed of Teflon, and is constructed in the same manner as the roller 16*c* (16*b*) shown in FIG. 8**.

Experiments have proven that with the apparatus 30 thus constructed, a marring of the copy sheet by the toner is greatly reduced, and the number of copy sheets which can be produced before the marring occurs increases to several times that experienced with the use of the apparatus 10. It is found that no marring occurred after producing from seventy to one hundred thousand copies.

Figure 11:
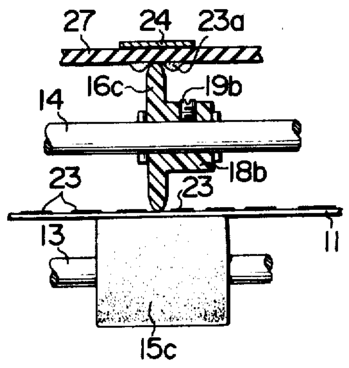
FIG. 11 is an enlarged cross section taken along the line Y—Y shown in FIG. 10.

The reason for the differential durability which prevents the occurrence of the marring is inferably attributed to the fact that while in the apparatus 10, the porous cleaning member 17 comprising nylon fibres removes any slight amount of toner deposited on the peripheral surface of the sliding contact rollers **16*b*, 16*c* by occlusion, the occlusion reaches its saturation to lose the cleaning effect while in the apparatus 30 of the present embodiment, no such phenomenon occurs with the cleaning member 27 which comprises silicone rubber. Specifically, there is no deposition of toner in a region of the cleaning member 27 where it bears against the sliding contact roller 16*c* (16*b*), and any toner 23*a* which is carried by the roller 16*c* (16*b*) is held adsorbed by the cleaning member 27, as shown in FIG. 11. It is found that when the amount of the deposited toner 23*a* reaches a given amount, there is no further increase in the amount of toner deposition. This is explained by a particular limit on the capability of retaining the toner 23*a* of the negative polarity by the high potential of the cleaning member 27 charged to the positive polarity by attraction, and if the limit is exceeded, the remaining toner which is small in quantity is left floating. This inference is also permitted by the high potential of the positive polarity to which the cleaning member 27** is charged inasmuch as it is one of KE series available from Shinetsu Silicone Company and has a very high dielectric constant.

A close examination with a microscope of traces formed in the cleaning member 27 as it is rubbed by the sliding contact roller **16*c* (16*b*) under the resilience of the spring member 24 reveals that the surface unevenness is smoothed with an increasing number of copies. This permits an inference that the surface of the sliding contact roller 16*c* (16*b*) which contacts the cleaning member 27 being smoothed is also simultaneously smoothed to prevent the deposition of toner 23*a* thereon. This is also supported by the fact that when the spring member 24** is removed, the marring of the copy sheet increases with an increasing number of copies.

From the foregoing description, it will be appreciated that a synergistic effect is achieved by the cooperation of the cleaning member, sliding contact rollers and the spring member to substantially reduce the marring of the copy sheets.

What is claimed is:

1. An apparatus for conveying a copy sheet for an electrophotographic copying machine, comprising:

a plurality of pairs of conveying rollers fixedly mounted on a pair of vertically aligned support shafts and abutting against each other to hold and convey a copy sheet therebetween which carries an unfixed toner image; and a plate-shaped cleaning and charging member disposed in direct abutment against the peripheral surface of one or more of said conveying rollers which are arranged to contact the unfixed toner image on the copy sheet, said plate-shaped cleaning and charging member operating to slidingly contact and thereby charge said one or more conveying rollers to the same polarity as the polarity of the toner by triboelectricity to repel the deposition of toner on said one or more conveying rollers and to clean said one or more conveying rollers if any toner is deposited thereon.

2. An apparatus for conveying a copy sheet according to claim 1 further including a spring member, said cleaning member being urged into abutment against said one or more conveying rollers by the resilience of said spring member.

3. An apparatus for conveying a copy sheet according to claim 2 in which the spring member comprises a resilient blade which engages the cleaning member from above.

4. An apparatus for conveying a copy sheet according to claim 1 in which the cleaning member is formed as a plate-shaped member of porous felt containing polyamide fibres while the one or more conveying rollers are formed of Teflon resin.

5. An apparatus for conveying a copy sheet according to claim 1 in which the cleaning member is in the form of a plate-shaped member of silicone rubber while the one or more conveying rollers are formed of Teflon resin.

6. An apparatus for conveying a copy sheet according to claim 1 in which the one or more conveying rollers are shaped as flange-shaped rollers having a reduced thickness and have a peripheral surface which is arcuate in cross section and which is smoothly finished.

7. An apparatus for conveying a copy sheet according to claim 1 in which the remaining conveying rollers are formed of frictional rubber having a high hardness on the order of H80°–90°.

* * * * *